United States Patent [19]
Sutterlin et al.

[11] Patent Number: 5,703,766
[45] Date of Patent: Dec. 30, 1997

[54] CAPACITOR POWER SUPPLY FOR INTERMITTENT TRANSMISSION

[75] Inventors: Philip H. Sutterlin, Saratoga; J. Marcus Stewart, San Jose; Amy O. Hurlbut, San Francisco, all of Calif.

[73] Assignee: Echelon Corporation, Palo Alto, Calif.

[21] Appl. No.: 610,831

[22] Filed: Mar. 5, 1996

[51] Int. Cl.$^6$ .................... H02J 3/36; H04B 5/02
[52] U.S. Cl. .................... 363/35; 375/219
[58] Field of Search .................... 363/35, 125, 123, 363/84; 323/282; 370/48, 44, 51, 52; 375/219, 220, 295, 310

[56] References Cited

U.S. PATENT DOCUMENTS

| | | | |
|---|---|---|---|
| 4,821,166 | 4/1989 | Albach | 363/89 |
| 4,962,354 | 10/1990 | Visser et al. | 323/360 |
| 5,018,138 | 5/1991 | Twitty et al. | 370/94.1 |
| 5,182,746 | 1/1993 | Hurlbut et al. | 370/100.1 |
| 5,347,549 | 9/1994 | Baumann et al. | 375/117 |
| 5,454,008 | 9/1995 | Baumann et al. | 375/369 |
| 5,548,614 | 8/1996 | Stoll et al. | 375/211 |

*Primary Examiner*—Adolf Berhane
*Attorney, Agent, or Firm*—Blakely, Sokoloff, Taylor & Zafman

[57] ABSTRACT

A power supply for a node that transmits data onto a power line. A DC supply and capacitor supply power to the node where the output current of the DC supply may be less than required for transmission by the node. When the voltage on the capacitor drops to Vmin transmissions are stopped allowing the capacitor to recharge. A timing circuit is used to determine when to begin transmission to compensate for variables in the node such as line voltages and part tolerances.

9 Claims, 5 Drawing Sheets

5,703,766

1
CAPACITOR POWER SUPPLY FOR INTERMITTENT TRANSMISSION

BACKGROUND OF THE INVENTION

1. Field of the Invention

The invention relates to the field of power supplies for communication transmitters.

2. Prior Art

In a network used for sensing and controlling such as described in U.S. Pat. No. 5,018,138 a plurality of nodes each having a cell and transceiver communicate over a medium such as a power line. Each node requires a DC power supply to power the integrated circuits in the node. This power is conveniently obtained from the power line where the power line is the medium over which communications occur. The power supply typically represents a significant portion of the cost of a node.

Generally the DC power supplies for the nodes are large enough to support continuous transmission by the transceivers. The power supply current needed for transmission may be as much as 10 times the current required for receiving. Thus for practical purposes, the power supply is sized to supply sufficient current for transmitting plus whatever other current is required by the node. This is true even though transmissions from the nodes are intermittent (e.g., occasional transmission of 50–75 msec data packets).

As will be seen the present invention enables the use of a DC power supply which provides substantially less continuous current than consumed by an active transmitter, resulting in significant cost savings.

SUMMARY OF THE INVENTION

A method for operating a transmitter which receives power from a DC power supply and a capacitor, where the DC power supply charges the capacitor to a maximum potential of Vmax is disclosed. First, transmissions by the transmitter are inhibited when the potential on the capacitor drops to a first predetermined potential (Vmin). This causes the capacitor to recharge from the DC power supply. The time at which the potential on the capacitor reaches a second predetermined potential which is higher than Vmin but less than Vmax is noted. Transmission is then permitted after waiting an additional period of time following the detection of the second potential on the capacitor.

Other aspects of the present invention are described in the detailed description of the present invention.

2

Figure 6:
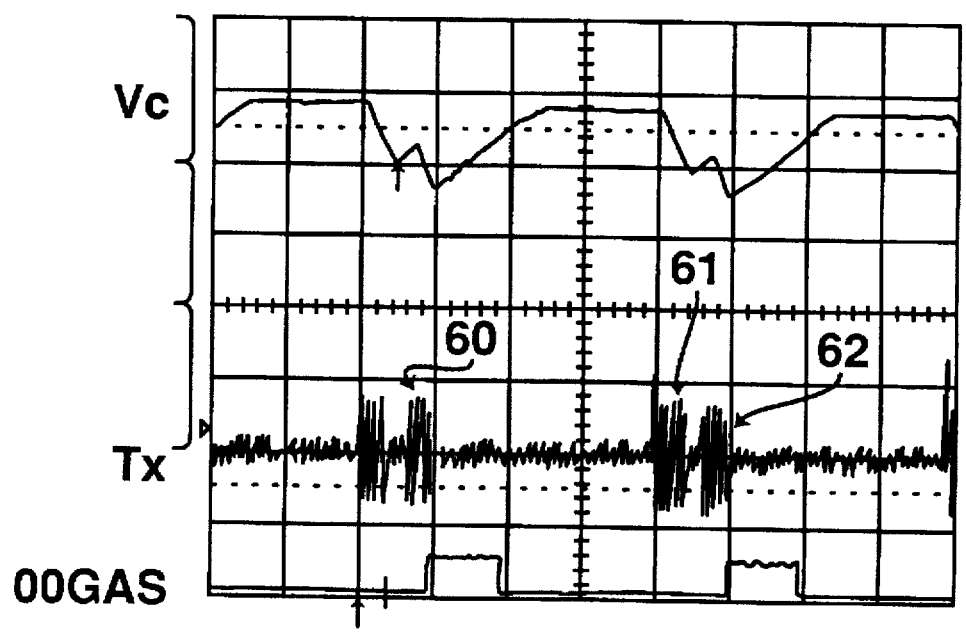

FIG. 6 shows on a time axis waveforms representing: the potential on a power supply capacitor, transmissions by a transmitter and a control signal used in the present invention for a fourth set of conditions.

Figure 7:
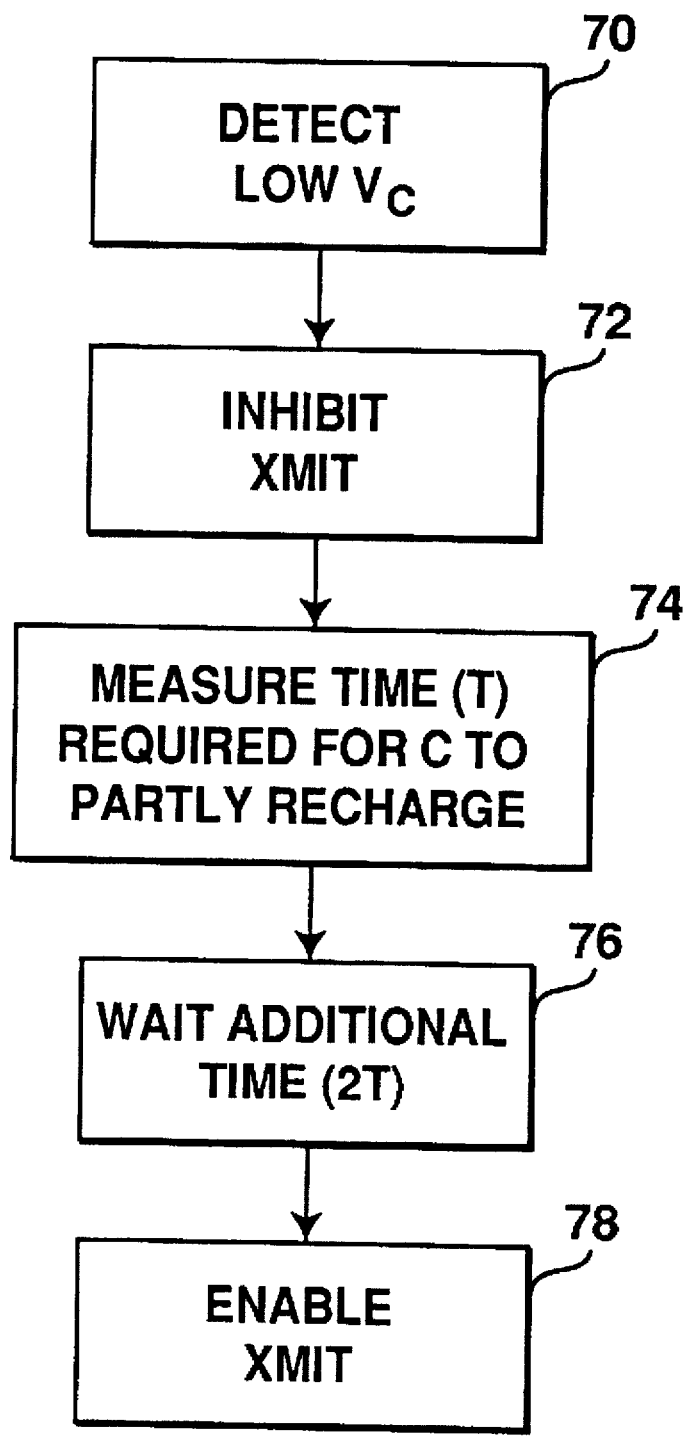

FIG. 7 illustrates a series of steps implemented by the present invention.

DETAILED DESCRIPTION OF THE PRESENT INVENTION

A method and apparatus for providing power for a transmitter is disclosed where the transmitter is not required to transmit continuously. In the following description numerous specific details are set forth, such as specific voltages, duty cycles, etc., in order to provide a thorough understanding of the present invention. It will be apparent that the present invention may be practiced without these specific details. In other instances, well-known components such as regulators and AC-to-DC power supplies are not shown in detail in order not to obscure the present invention.

OVERALL SYSTEM OF FIG. 1

Figure 1:
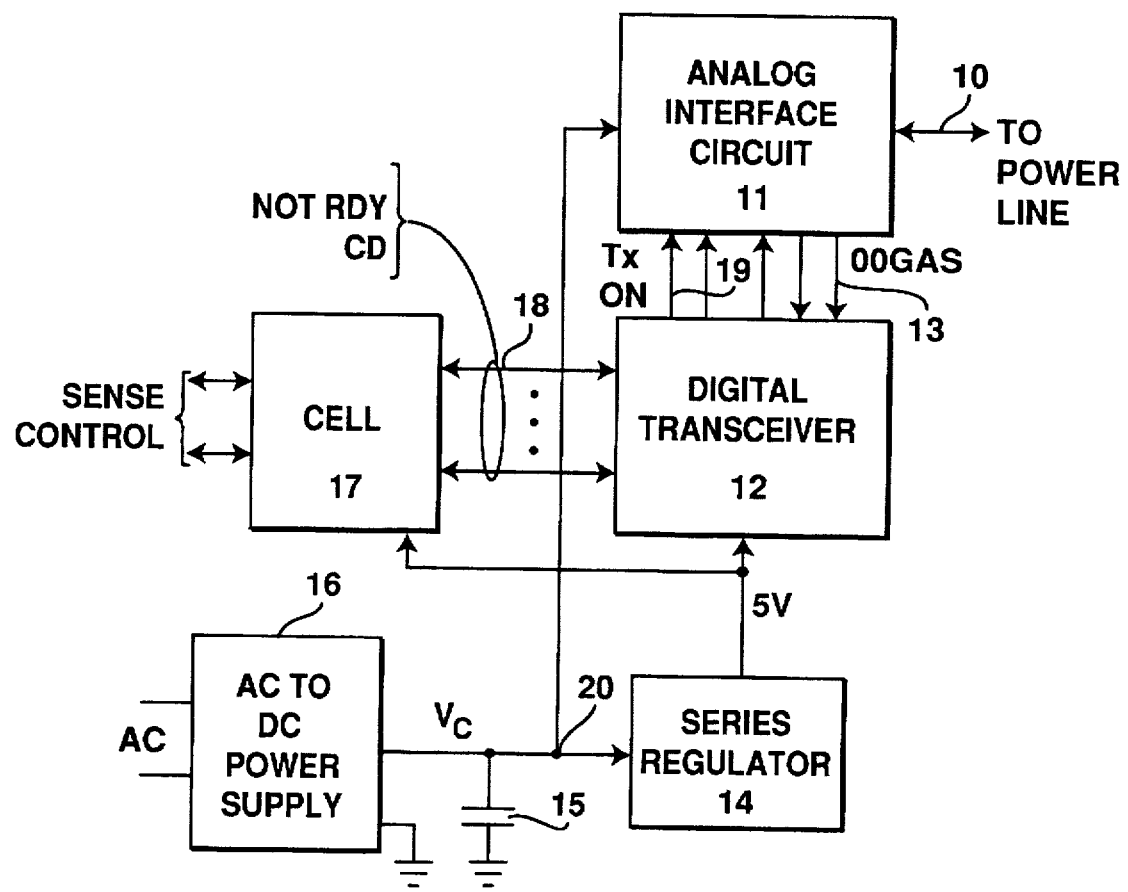
FIG. 1 is a block diagram showing a node in a network which incorporates the improvement of the present invention.

In FIG. 1, a node comprising a cell 17, digital transceiver 12, analog interface circuit 11, and power supply 16 is illustrated. The analog interface circuit 11 drives data packets onto a power line via lines 10. The analog interface circuit 11 in one embodiment comprises an integrated circuit which receives digital signals from the digital transceiver 12 and provides an appropriate analog signal for driving data packets onto the power line. Additionally, signals from the power line are coupled through the analog interface circuit 11 to the digital transceiver unit 12 when data packets are received from the power line. The digital transceiver 12, in addition to communicating with interface circuit 11, communicates with a cell 17. Cell 17, by way of example, senses the state of a switch, controls a switch or performs other sensing and control functions. The cell 17 both receives signals from transceiver 12 and provides signals to transceiver 12. Both transceiver 12 and cell 17 are preferably integrated circuits. In one embodiment, the cell may be a Motorola part no. MC3150. A cell for use in FIG. 1 is also described in U.S. Pat. No. 5,018,138.

An interface for providing signals between the cell 17 and the transceiver 12 is described in U.S. Pat. No. 5,182,746. Two signals which are transmitted between the cell and transceiver 12 over the lines 18 and which are referred to below are a "NOT RDY" indication sent by transceiver 12 to cell 17 and a collision detect (CD) indication also sent by the transceiver 12 to the cell 17. NOT RDY informs the cell 17 that the transceiver 12 is not ready to transmit onto the power line. The collision detect signal informs the cell 17 that the packet transmission has been aborted before completion. This informs the cell that it should resend data to transceiver 12 for retransmission onto the power line (via interface circuit 11). The interface circuit 11 and transceiver 12 may be commercially available integrated circuits except for specific additional functions which they perform in accordance with the present invention and which are described below and shown in FIG. 2. These additional functions may be implemented "on chip" using well-known circuits as will be apparent from FIG. 2.

In practice, the cell 17 senses or controls and communicates with other nodes through the circuits 11 and 12. Thus, data packets originating in the cell 17 are first communicated to transceiver 12 and prepared for transmission before being coupled to interface circuit 11. Likewise, data packets from the power line are coupled via the interface circuit 11 to transceiver 12 where signal processing and other digital processing takes place. The interface circuit 11 is primarily an analog driver/receiver circuit for coupling signals to and receiving signals from the power line.

Two signals which are communicated between transceiver 12 and interface circuit 11 for use in the present invention are the TXON signal transmitted over line 19 and the "out of gas" (OOGAS) signal transmitted on line 13. The TXON signal which is transmitted from transceiver 12 to interface circuit 11, controls when the transmit drive amplifier of interface circuit 11 is active. When this signal is inactive (low) transmission is inhibited. If this signal goes low during a transmission, the transmission is immediately halted. The OOGAS signal which is transmitted from interface circuit 11 to transceiver 12 on line 13 becomes active (high) when the power supply potential applied to interface circuit 11 from line 20 (Vc) has fallen to a first predetermined potential (Vmin). This potential is the lowest potential at which the interface circuit 11 and series regulator 14 are able to function as intended. OOGAS returns to its inactive state when Vc rises to a second predetermined potential.

Power for the node of FIG. 1 is provided from the AC power line which in this example is also the medium for the transmission of data packets between nodes. The AC power is converted to DC power by the AC-to-DC power supply 16. The DC output from supply 16 is coupled to a series regulator 14 which provides, by way of example, a regulated 5 volts for the transceiver 12 and the cell 17. A capacitor 15, which receives charge directly from the power supply 16, stores energy for the regulator 14 and for the analog interface circuit 11. In one embodiment the capacitor 15 is 3,000 µF (16V). Thus interface circuit 11 is directly powered from the output of the power supply 16 and from the capacitor 15.

OVERVIEW OF THE PRESENT INVENTION AS IT FUNCTIONS IN THE NODE OF FIG. 1

The operation of the present invention is perhaps best understood when referring to an example. Assume that the power supply 16 must supply 30 mA of current to the regulator 14 for operating transceiver 12 and cell 17. Also, assume that analog interface circuit 11 requires 250 mA for transmission. (The amount of current required by interface circuit 11 for receiving signals from the power line is only a few mA and can be ignored for purposes of discussion here.) On first examination it would appear that the power supply 16 must provide the sum of 250 mA and 30 mA, that is, 280 mA. With the present invention the power supply 16 may, for example, provide only 70 mA; 30 mA for the regulator 14 which powers the transceiver 12 and cell 17 and the remaining 40 mA for charging the capacitor 15 while no transmissions are occurring.

For the network under discussion, the interface circuit only randomly transmits packets and consequently does not continuously require 280 mA. The capacitor 15 is charged to the upper output potential (Vmax) of the power supply 16 (e.g., 15 volts) which potential is applied to interface circuit 11. Since data packets of only 50-75 msecs duration are typically transmitted by the transceiver, the capacitor 15 provides ample energy for transmitting at least one such packet before the voltage on capacitor 15 drops to Vmin.

If a plurality of packets are closely spaced in time, the voltage on capacitor 15 may drop to the predetermined potential (Vmin). Interface circuit 11 senses the drop in potential to Vmin and in response provides the OOGAS signal on line 13 to the digital transceiver 12. Transceiver 12, in turn, causes the signal TXON on line 19 to go inactive (thereby halting any transmission in progress) and temporarily prevents further transmissions. Additionally, when OOGAS becomes active, transceiver 12 indicates to cell 17 that a "collision" has been detected. While a collision with other data on the power line did not actually occur, the result (i.e., interrupted packet transmission) and the desired action of retransmission of the disturbed packet are the same as if a collision had occurred. Thus the collision detect signal may be used to cause cell 17 to schedule a retransmission of the last (interrupted) packet.

Once the interface circuit 11 ceases transmitting, 40 mA from the power supply 16 are available to recharge capacitor 15 for the example used above. When capacitor 15 reaches a second predetermined potential the OOGAS signal goes inactive and then, in the preferred embodiment, transmissions are enabled again after a period of time which is a function of the time for which OOGAS was high. The second predetermined potential is less than Vmax and more than Vmin. In one embodiment the second predetermined voltage lies about ½ way between these values.

Thus as can be seen for the previous example, the power supply 16 provides approximately ¼ the power needed for sustaining continuous transmissions from interface circuit 11, transceiver 12 and cell 17. This substantially reduces the cost of power supply 16 and consequently the cost of equipping a node as shown in FIG. 1.

As will be discussed in more detail below, it is not always easy to determine when to enable transmissions once Vc drops to Vmin and then rises. There are a number of variables, such as the maximum output current of the DC power supply, which typically is a function of the input AC voltage. Additionally, the capacitor 15 may have a tolerance of ±20% and the current drawn by the interface circuit 11 is a function of the impedance of the power line as seen by the interface circuit 11. These and other variables make it less than optimal to, for instance, enable transmissions after simply waiting a fixed period of time.

If a fixed time delay were chosen which was long enough to ensure full recharge under worst case conditions, then transmissions would be held off for unnecessarily long periods when more common typical conditions exist. On the other hand, if a shorter fixed delay were chosen then under worst case conditions the capacitor 15 would not recharge sufficiently to allow transmission of even one complete packet.

The significance of this matter is magnified by the fact that the current from power supply 16 used to recharge capacitor 15 is only a fraction of the current capacity of supply 16. In the earlier example, 40 mA of the power supply's 70 mA capacity was available for recharging capacitor 15. If the output capacity of supply 16 drops 10% to 63 mA (e.g., due to low AC line voltage or internal component tolerances) then the current available to recharge capacitor 15 decreases to 33 mA—a drop of 18%. This translates into 18% more time to recharge capacitor 15.

A similar multiplicitive increase in recharge time occurs for a given percentage increase in transceiver 12 and cell 17 current consumption (due, for example, to tolerances in the manufacture of cell 17 and transceiver 12).

A second non-optimal method for determining when to enable transmission after Vc drops and then rises is to simply measure when capacitor 15 is essentially at full charge. If the measured value chosen for "full charge" is too high then a supply with its upper output voltage on the lower tolerance end may never be allowed to transmit. On the other hand, if the measured value chosen for "full charge" is lower to account for measurement and supply tolerances then transmission may be enabled prior to capacitor 15 being fully charged.

Thus, one of the purposes of the present invention is to provide a more optimal method for determining when to enable transmissions following power supply output voltage drop.

THE METHOD IMPLEMENTED BY THE PRESENT INVENTION

In FIG. 7 the steps implemented by the present invention are shown as steps 70–78. These steps ensure that the analog interface circuit 11, series regulator 14 (and thus transceiver 12 and cell 17) have sufficient voltage for proper operation.

First, as shown by step 70 the voltage on the capacitor 15 is detected and, in particular, a predetermined voltage which in one embodiment is the minimum voltage at which the interface circuit 11 will operate (Vmin) is detected. By way of example, assume that the maximum DC output voltage from the power supply 16 is 16 volts, this occurring when the AC voltage is at its upper extreme, and that the interface circuit 11 will operate satisfactorily with a voltage as low as 8 volts (Vmin=8 volts). For purposes of discussion it is assumed that the receiving circuitry of the interface circuit 11 as well as regulator 14 operates satisfactorily at a voltage of 8 volts or higher.

Once Vmin is detected as shown by step 70, then as shown by step 72 transmission is inhibited: that is, for the node of FIG. 1, interface circuit 11 is prevented from transmitting onto the power line. Once this occurs the capacitor 15 of FIG. 1 begins to recharge since the current output of the supply 16 is greater than the power consumed by the regulator, transceiver 12, cell 17 and the power needed by interface circuit 11 in the receive mode.

As shown by step 74 the time (T) required for the capacitor 15 of FIG. 1 to partly recharge is measured. For the example under discussion the time for the capacitor 15 to charge from 8 volts to 12 volts is measured. Then as shown by step 76, an additional period of time is allowed to lapse before transmission from the interface circuit 11 is permitted. In one embodiment this period of time is equal to 2T where T is the period measured in step 74. This additional period of time (2T) gives the capacitor 15 additional time to charge to its maximum value (Vmax).

As shown by step 78 after the passage of time of step 76, transmission is enabled; that is, the transmitter portion of the interface circuit 11 is permitted to transmit if and when it receives a signal from the cell 17 through the digital transceiver 12.

CIRCUIT FOR IMPLEMENTING THE PRESENT INVENTION

Figure 2:
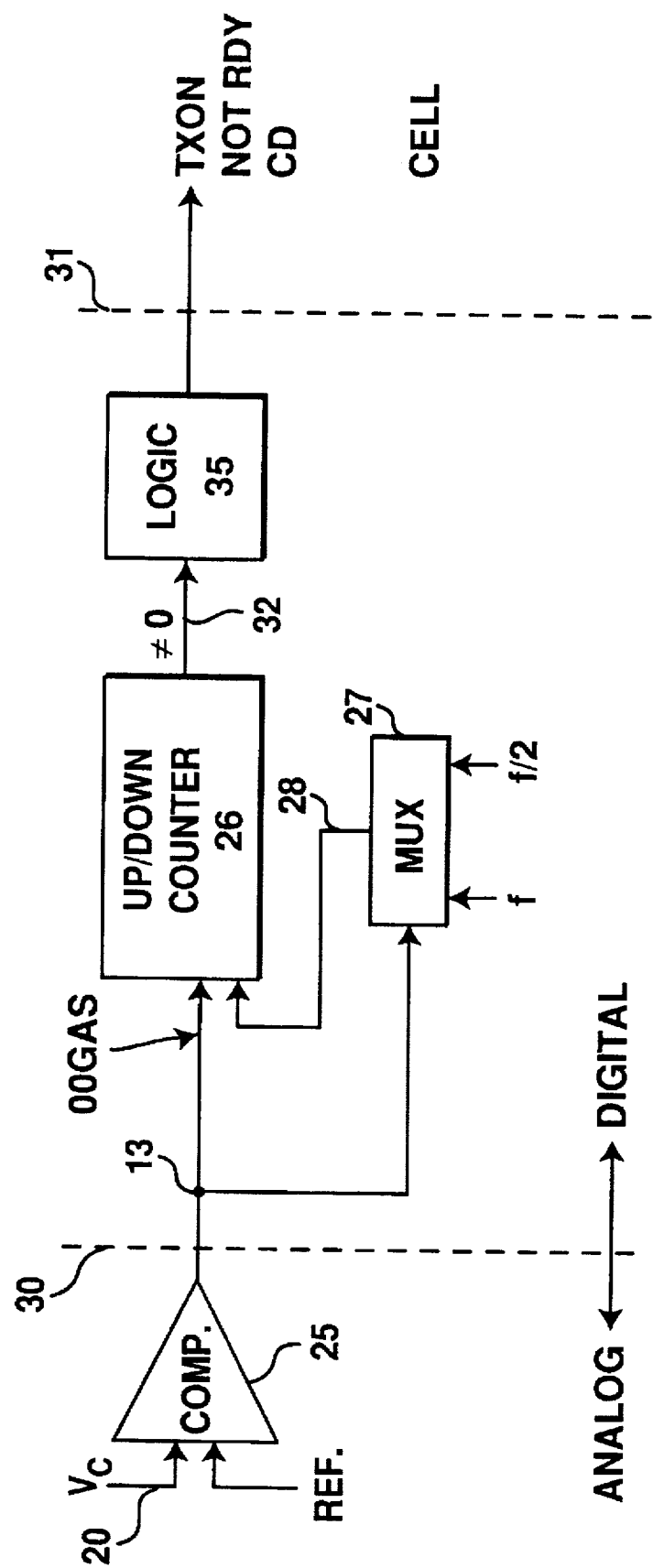
FIG. 2 is a block diagram of the circuit elements used to implement the present invention for one embodiment.

Referring now to FIG. 2, part of the circuitry for implementing the present invention is integrated into interface circuit 11 and part of it is integrated into the transceiver 12. The portion of the circuit in the analog interface circuit 11 is shown to the left of the dotted line 30, the portion of the circuit implemented as part of the transceiver 12 is shown between the dotted lines 30 and 31.

Within interface circuit 11, a comparator 25 compares the potential on line 20, (the potential on the capacitor 15) with a reference potential. This reference is selected so that the output of the comparator 25 goes high if Vc drops to Vmin. For the example under consideration Vmin is 8 volts. The output of the comparator 13 is the OOGAS signal which is coupled over line 13 from the interface circuit 11 to the transceiver 12. The comparator 25 includes hysteresis such that the output of the comparator 25 drops in potential (inactive state) when Vc reaches a potential between Vmin and Vmax. For the example under consideration this potential is 12 volts. Thus, OOGAS goes active when Vc is at or below 8 volts and remains active until Vc is charged to 12 volts.

A digital counter 26 is included on the transceiver 12. Initially, the count in counter 26 is 0. (As will be discussed, up/down counting is controlled by OOGAS signal.) The counter increments or decrements at a rate determined by the signal on line 28. This rate is either $f$ or $f/2$. One of these timing signals is selected by the multiplexer 27 under control of the OOGAS signal. When the OOGAS signal is high, the frequency $f$ is selected by the multiplexer 27 and consequently the counter 26 counts at the rate $f$. Similarly, when the OOGAS signal is low, the multiplexer 27 selects $f/2$ and the counter 26 counts at that rate. Anytime the counter 26 has a count other than 0, a signal is provided on line 32 to the logic circuit 35. This circuit combines the counter output with other signals (e.g., timing) to provide the TXON, NOT RDY, and CD signals. Thus one output of logic circuit 35 is used to prevent transmissions from the interface circuit 11 through the TXON signal which enables transmissions by the interface circuit 11. Transmissions are prevented when the signal on line 19 is low. Another output of the circuit 35 is sent (via the interface between cell 17 and transceiver 12) to the cell 17 as the "NOT RDY" indication to prevent the cell 17 from sending a data packet to the transceiver 12. Another output of the circuit 35 is sent (via the interface between cell 17 and transceiver 12) to the cell 17 as the "CD" indication to indicate that a transmission was aborted before completion. As mentioned, the interface between transceiver 12 and cell 17 as used in one embodiment of the invention is described in U.S. Pat. No. 5,182,746.

An active OOGAS signal on line 13 causes the counter 26 to increment at the rate of the timing signal on line 28 ($f$). When the signal on line 13 is low, counter 26 decrements at the rate of a signal on line 28 ($f/2$) until the counter reaches the count of 0. Once the counter 26 reaches 0 it remains at 0 until OOGAS becomes active. Thus, when the comparator 25 detects Vmin, OOGAS becomes active, and the counter 26 begins counting up at the rate $f$. When Vc=12V for the example under consideration, OOGAS goes inactive and the counter counts down at the rate of $f/2$. Thus, if 100 msecs was required for the capacitor to charge from 8 volts to 12 volts, the signal on line 32 would remain high for an additional 200 msecs since the counter in counter 26 will take twice as long to decrement to 0 at the rate $f/2$.

Generally when Vmin is detected the interface circuit 11 will be transmitting, otherwise the capacitor 15 would not be discharging. More likely than not, a transmission by the interface circuit 11 will be interrupted when Vmin is detected and the signal on line 19 drops causing the interface circuit 11 to cease transmitting. (It is possible, however, that Vmin will be reached at the very end of a transmission.)

For the circuit of FIG. 1, a mechanism is provided to assure that the interrupted data packet is retransmitted. The transceiver includes a mechanism for detecting a collision between a data packet being transmitted and a data packet on the power line. When a collision is detected the cell 17 is notified of the collision and at a later time retransmits the message. A signal "CD" indicating a collision detection is sent from the transceiver 12 to the cell 17 over the interface previously discussed.

The CD signal is also used to cause data packets that were interrupted by Vc=Vmin being detected to be retransmitted when Vc recovers. Thus, CD is transmitted by the transceiver 12 to the cell 17 when the interface circuit 11 is interrupted from transmitting a complete packet. The cell, in effect, is made to believe that a collision has occurred and therefore it attempts to retransmit the data packet. The NOT RDY signal provided by the transceiver 12 to the cell 17 prevents the retransmission until such time as the capacitor is sufficiently charged.

DIAGRAMS ILLUSTRATING PERFORMANCE

Figure 3:
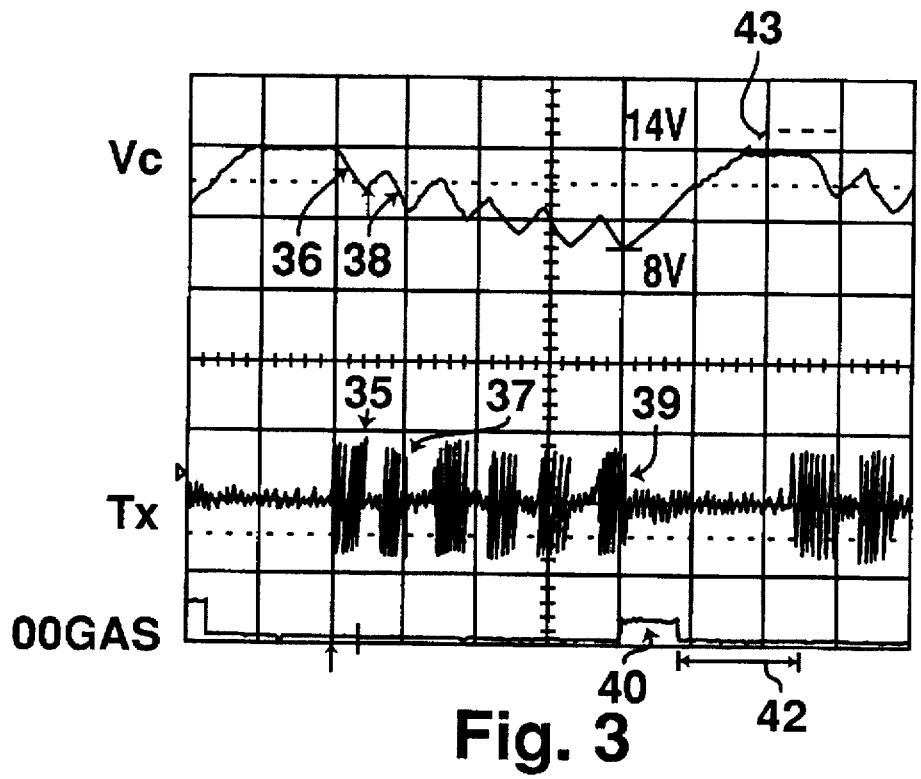
FIG. 3 shows on a time axis waveforms representing: the potential on a power supply capacitor, transmissions by a transmitter and a control signal used in the present invention for a first set of operating conditions.

In FIG. 3 the upper waveform represents the voltage Vc on the capacitor 15 of FIG. 1. For this figure as well as FIGS. 4-5, it is assumed that the output of the power supply 16 is 14 volts; that is, a condition where the voltage tolerance is low, preventing the capacitor 15 from reaching a fully charged state. Vmin is assumed to be 8 volts. The middle waveform labeled "TX" represents the transmissions from the interface circuit 11 of FIG. 1. Several packets are shown along the time axis such as packets 35, 37 and 39. The lower waveform represents the OOGAS signal. This signal is shown active or high at pulse 40.

The drop in Vc shown by segment 36 occurs during the transmission of the packet 35. At the end of the transmission of packet 35 there is a rise in Vc as the capacitor is partly recharged from the power supply. When transmission begins for packet 37 there is again a drop in Vc shown by the segment 38 of the Vc waveform. Again there is a rise in potential following the end of the transmission of packet 37 since the transmitter is off. Four additional packets of data are transmitted, the last of which is packet 39. During the transmission of each of these packets there is a drop in the potential Vc followed by a rise in potential between the transmissions. In general, as can be seen in FIG. 3, the packet transmissions are occurring at a fast enough rate to reduce the overall charge on the capacitor. During packet 39 or at the end of packet 39, Vc drops to 8 volts causing the OOGAS signal to rise in potential as shown by pulse 40.

OOGAS remains high until the Vc signal charges to approximately 12 volts for the example discussed above. Transmission is inhibited for an additional period corresponding to period 42 which is twice the duration of the pulse 40 for the embodiment discussed above. Before the end of the period 42 the potential on Vc rises to 14 volts, which corresponds to the maximum output from the power supply for the conditions under discussion. At the end of period 42 the "NOT RDY" indication transmitted to cell 17 becomes inactive thereby allowing cell 17 to transmit through the transceiver 12 and interface circuit 11 while the TXON signal on line 19 enables the transmit circuitry of the analog interface. For the example of FIG. 3, if the output of the power supply were equal to 16 volts then during the period 42 the potential Vc would climb to 16 volts as shown by the dotted line 43.

Figure 4:
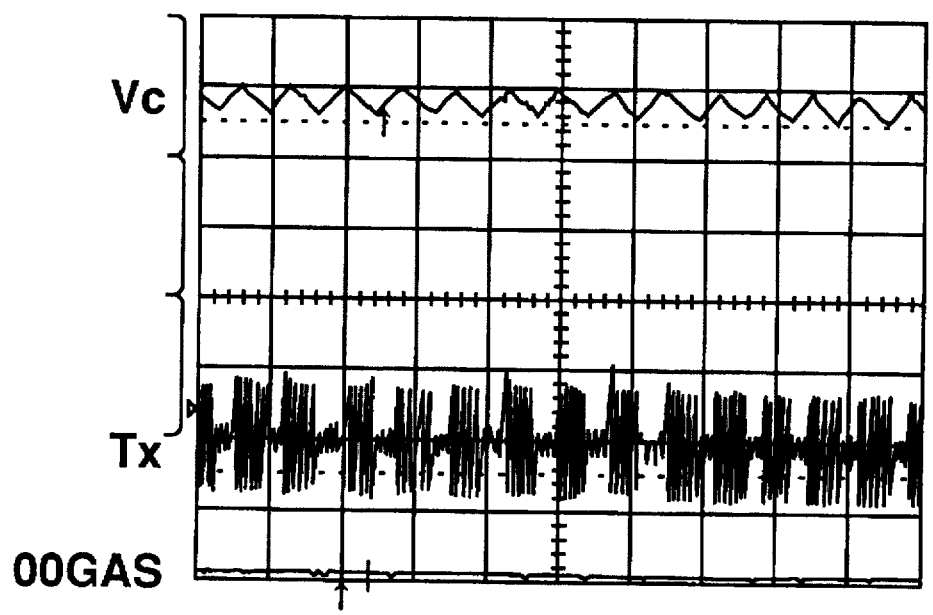
FIG. 4 shows on a time axis waveforms representing: the potential on a power supply capacitor, transmissions by a transmitter and a control signal used in the present invention for a second set of operating conditions.

FIG. 4 shows another example where a plurality of transmissions occur. During each transmission Vc drops as charge is removed from the capacitor to power the transmitter of interface circuit 11. After the transmission and before another transmission begins, the capacitor is charged to its initial voltage as shown. For this example, the duty cycle of the transmitter and the load presented by the transmitter on the capacitor is not great enough to discharge the capacitor to Vmin. Thus OOGAS never become active since Vc remains well above Vmin.

Figure 5:
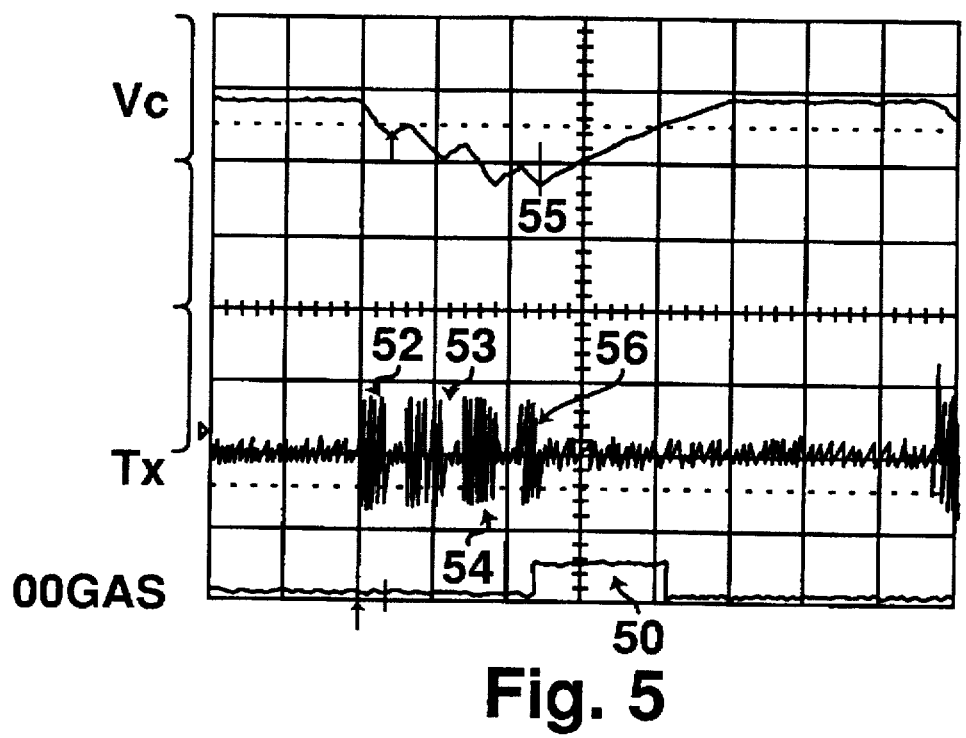
FIG. 5 shows on a time axis waveforms representing: the potential on a power supply capacitor, transmissions by a transmitter and a control signal used in the present invention for a third set of operating conditions.

In the example of FIG. 5, Vc decreases for data packets 52, 53 and 54. There is insufficient recharging between these packets to maintain Vc at a constant level. During packet 56, as indicated by time 55, Vc reaches Vmin and OOGAS rises as shown by pulse 50. Transmissions are resumed after a period corresponding to three times the period of the pulse 50 following time 55.

In FIG. 6 a somewhat worse case is shown where every other packet is interrupted. For instance, packet 60 is interrupted, packet 61 is successfully transmitted and then packet 62 is interrupted.

Thus, a power supply for a transmitter is described which uses a capacitor to store energy for transmissions. The source of DC current for the capacitor provides less current than is consumed by the transmitter. The present invention is particularly useful where the transmitter transmits randomly or intermittently. The cost of the AC-to-DC power supply is substantially reduced since the power supply need not supply a constant higher current needed to power the transceiver's transmit circuitry.

We claim:

1. A method for operating a transmitter which receives power from a DC power supply and a capacitor, where the DC power supply charges the capacitor to a maximum potential of Vmax, comprising the steps of:

inhibiting transmission by the transmitter when the potential on the capacitor drops to a first predetermined potential;

detecting when the potential on the capacitor reaches a second predetermined potential, the second potential lying between the first potential and Vmax; and, permitting transmission by the transmitter after waiting a predetermined period of time following the detection of the second potential.

2. The method defined by claim 1 wherein the predetermined period of time is a function of a period measured between when transmission is inhibited and when the second potential is detected.

3. A method for operating a transmitter from a DC power supply where the transmitter requires a current $I_T$ for transmitting, comprising the steps of:

providing a power supply which provides a DC current less than $I_T$;

coupling a capacitor to the power supply and the transmitter such that the capacitor is charged by the power supply and current from the capacitor provides energy to the transmitter during transmission;

inhibiting transmissions by the transmitter when a voltage on the capacitor is too low (Vmin) to enable transmissions by the transmitter;

enabling transmissions by the transmitter when a voltage on the capacitor is high enough to permit transmission by the transmitter.

4. The method defined by claim 3 wherein the power supply charges the capacitor to a maximum potential of Vmax and where the enabling step permits transmission when the voltage on the capacitor is between Vmin and Vmax.

5. The method defined by claim 3 wherein the transmitter transmits data packets and the additional step of transmitting a data packet, the transmission of which was interrupted by the inhibiting step.

6. A method for providing power to a load from a DC power supply and capacitor at a voltage of at least Vmin comprising the steps of:

decoupling the load from the DC power supply and capacitor when the potential on the capacitor drops to a first predetermined voltage Vmin;

measuring the time required for the voltage on the capacitor to rise to a second predetermined voltage which is greater than Vmin;

waiting a period of time which is a function of the time measured in the preceding step; and, coupling the load to the DC power supply and capacitor.

7. A power supply for providing power to a transmitter comprising:

an AC-to-DC power supply;

a capacitor coupled to receive DC current from the power supply, the capacitor being coupled to supply power to the transmitter;

first means coupled to the capacitor for sensing the potential on the capacitor; and, timing means for measuring time, the timing means counting time under control of the first means, the timing means being coupled to prevent transmission from the transmitter.

8. The power supply defined by claim 7 wherein the timing means is a counter and wherein the first means controls whether the counter increments or decrements.

9. A method for use in a node for coupling to a network where the node includes a mechanism for detecting the collision of a packet of data transmitted from the node onto the network and causing the packet of data to be subsequently transmitted onto the network, comprising the steps of:

preventing transmission from the node when the potential of a power supply supplying power to the node drops to a predetermined voltage; and, asserting a signal used by the mechanism for detecting the collision to cause a data packet interrupted by the preventing step to be subsequently retransmitted.

* * * * *